United States Patent [19]

Hulsman

[11] Patent Number: 4,774,830
[45] Date of Patent: Oct. 4, 1988

[54] TESTING CONTAINER SEALS

[75] Inventor: William H. Hulsman, Falmouth, Mass.

[73] Assignee: Benthos, Inc., North Falmouth, Mass.

[21] Appl. No.: 89,328

[22] Filed: Aug. 25, 1987

Related U.S. Application Data

[63] Continuation of Ser. No. 879,077, Jun. 26, 1986, abandoned.

[51] Int. Cl.⁴ ............................................. G01M 3/36
[52] U.S. Cl. ...................................... 73/49.3; 73/49.8
[58] Field of Search ................... 73/49.3, 49.2 R, 52, 73/49.8

[56] References Cited

U.S. PATENT DOCUMENTS

| | | | |
|---|---|---|---|
| 1,447,701 | 3/1923 | White | 73/49.3 X |
| 1,825,699 | 10/1931 | Landrum | 73/49.3 |
| 1,974,026 | 9/1934 | Hicks | 73/49.3 |
| 2,093,429 | 9/1937 | Foss | 73/52 |
| 2,695,515 | 11/1954 | Ward et al. | 73/37 |
| 3,751,972 | 8/1973 | Hass | 73/45.4 |
| 3,930,401 | 1/1976 | Filler | 73/49.2 |
| 3,973,249 | 8/1976 | Yokote et al. | 340/242 |
| 4,117,718 | 10/1978 | Hayward | 73/52 |
| 4,188,819 | 2/1980 | Egee et al. | 73/52 |
| 4,326,408 | 4/1982 | Kanoh | 73/49.3 |
| 4,409,818 | 10/1983 | Wyslotsky et al. | 73/49.3 |

FOREIGN PATENT DOCUMENTS 209624 11/1956 Australia .
17833 1/1982 Japan .

Primary Examiner—Stewart J. Levy
Assistant Examiner—Joseph W. Roskos

[57] ABSTRACT

Leak detector for use in detecting defective flange-shaped seals between lid and body portions of a package. A pressure chamber is provided for isolating the external edge of the seal and applying test pressure thereto. Containment of the pressure chamber includes sealing pressure applied mechanically to the flange-shaped package seal during testing, but this sealing pressure does not affect seal testing because it is appropriately limited by a self-compensating biasing of the mechanical seal.

28 Claims, 3 Drawing Sheets

TESTING CONTAINER SEALS

This application is a continuation of application Ser. No. 879,077, filed June 26, 1986, now abandoned.

BACKGROUND OF THE INVENTION

This invention relates to a novel process for detection of leaky seals in containers and apparatus for carrying out this process. The invention is related particularly to detecting leaks in packages having a flexible lid material sealed to a container body such that the resulting seal structure forms a flange-like structure on the sealed package.

Many leak-detecting machines have been suggested over the years. Some such machines utilize some method of infusing air into a leaky container. One such Patent 4,326,408 to Kanoh describes how leakage of air into a watchcase is detected. Most such apparatus, however, is used in packaging of food or other objects which are sealed in sterile packages. Thus U.S. Pat. Nos. 2,093,429 to Foss; 3,751,972 to Hass; and 1,974,026 to Hicks show methods of testing cans. Proximity sensors are known for use in detecting movement of a container wall as seen in U.S. Pat. No. 4,188,819. More recently Wyslotsky et al, in U.S. Pat. No. 4,409,818 utilizes displacement sensors to detect air blown through defective seals between two plastic sheets (one a container structure, the other a lid structure) of a package.

It will be evident that the Wyslotsky device depends upon the availability of unsealed package area for effective containment of test gases. Moreover, it will be noted that Wyslotsky's test pressure exerts a significant pull on the package webs and thereby tends to pull a seal open. This limits somewhat the strength of seal utilized with that apparatus.

SUMMARY OF THE INVENTION

Therefore, it is a principle object of the invention to be able to provide dependable, fast and sensitive leak-detection in packages having sealed flange areas formed of a lid and flanged body portions of the container.

It is a particular object of the invention to be able to accomplish such testing while the container is maintained at atmospheric pressure and with pressurized test fluid only selectively applied to the seal-exposing edge of the sealed flange.

Another object of the invention is to achieve a seal between ambient pressure and test pressure by means of a mechanical, pressure-retaining seal applied directly to the sealed flange itself and to do this without pinching-off defects in the seal which must be identified.

Another object of the invention is to provide a self-compensating mechanical seal for application to the package seal during testing.

Still another object of the invention is to provide a process for effecting such testing which accommodates the geometrical and structural nature of flexible packaging materials to assure detection.

Other objects of the invention will be obvious to those skilled in the art on their reading of this disclosure.

The above objects have been substantially achieved by construction and use of a leak-detecting apparatus having means to support a sealed flange of a package to be tested and a pressure chamber assembly adapted to be moved downwardly to form a pressure chamber. The pressure chamber is mechanically sealed against the sealed flange around the container. The exterior edge of said sealed flange is isolated from ambient pressure and enclosed within a pressure chamber.

Another advantageous feature of the invention provides that a gasketed seal means bearing against the sealed flange portion of the package, i.e., the portion of the package under test, is biased such that only a light sealing pressure is initially applied to said flanged portion of the package to be tested. When test pressure is applied, the light sealing pressure is automatically increased, e.g., by the action of the gas pressure on the seal means bearing against the seal under test. This action maintains the differential pressure across the package seal at a suitably low level thereby avoiding both damage to the package seal and the sealing off of leaks to be detected.

It has been found that a gasket of this mechanical seal means is preferably neither too soft nor too hard for optimum performance. Shore A durometer values of about 20 to 100 are preferred. This allows the apparatus to be used with a wide variety of packages and seals without incurring any problems associated with both excessive deformation of the gasket when pressure is applied and excessive rigidity of the gasket. Either factor, when combined with imperfections in the quality of webs used to form the package, can result in excessively-high localized pressure on the flange and damage the seal to be tested.

The apparatus of the invention can be constructed in any number of configurations. A preferred configuration is one wherein the pressure chamber assembly surrounds a package and seals off the periphery of a flange-shaped package seal which itself surrounds the periphery of a package. In such circumstances, it is particularly desirable to have initial light-sealing pressure, (e.g. a few ounces of pressure per lineal inch of seal) exerted by the pressure chamber assembly, to be applied by a thin, resilient, sheet forming biasing means and arranged in generally annular relationship with respect to the pressure chamber, and extending cantilevered (as viewed in section) outwardly from a portion of the structure, or housing, of said pressure chamber such that the sheet is forced toward the package seal by test pressure. The seal means which is to bear against the package seal is thus pushed tighter by increased pressure on the resilient sheet. The mechanical seal is thereby automatically adjusted for air pressure which may invade the package seal under test while, at the same time, maintaining its effective sealing of the pressure chamber assembly against the package.

In the preferred mode of the invention, a proximity sensor is centrally carried on the seal assembly and acts to determine the position of the pressure-flexed lid of the container.

The apparatus is typically operated at a sensitivity such that a 0.005 to 0.010-inch movement of the package lid causes deflection.

The sensor illustrated below is a linear proximity sensor available from Electro Corporation of Sarasota, Florida. It is of the type that generates a field below the sensor. When a metal object enters the field, such as a flexible aluminum lid construction, eddy currents are induced and these currents are detected by the sensor. The strength of the sensed signal is a measure of how close the metal-bearing lid is to the sensor. Other sensor means can be used which can sense the initial position of a lid and the position assumed during leak testing.

Among such proximity sensors are ultrasonic position-detecting sensors, e.g., of the general type available from Polaroid Corporation of Cambridge, Massachusetts. Ultrasound detecting sensors of the type which can listen to a leak may be used as a detecting means, also. Such sensors are sold by American Gas & Chemical Co., Ltd. of Northvale New Jersey. It has been noted that Ultrasound detectors can be used in conjunction with the leak detectors of the invention to listen for air leaking through the lid and thereby extending the function and use of the leak detectors of the invention which, in the form described herein, assume the integrity of the container and lid structure.

ILLUSTRATIVE EMBODIMENT OF THE INVENTION

In this application there is described a preferred embodiment of the invention and suggested various alternatives and modifications thereof, but it is to be understood that these are not intended to be exhaustive and that other changes and modifications can be made within the scope of the invention. The suggestions herein are selected and included for the purposes of illustration in order that other skilled in the art will more fully understand the invention and the principles thereof and will be able to modify it and embody it in a variety of forms, each as may be best suited to the condition of a particular case.

IN THE DRAWINGS

It will be understood that the apparatus of the invention will include suitable support means for positioning the container to be tested with respect to the leak-detecting means. Moreover, the air is admitted and allowed out of the system through valves and with the use of electronic controls which are commonly used in the engering arts. These aspects of the apparatus are not novel in themselves and are not described in detail herein. Many different versions of such control systems can be used, and they can be readily selected and utilized by engineers familiar with the design of pneumatically and/or electronically actuated automatic test apparatus. Normally such apparatus will be packaged in an appropriate exterior housing with whatever pneumatic and electronic controls desirable for its operation.

Figure 1:
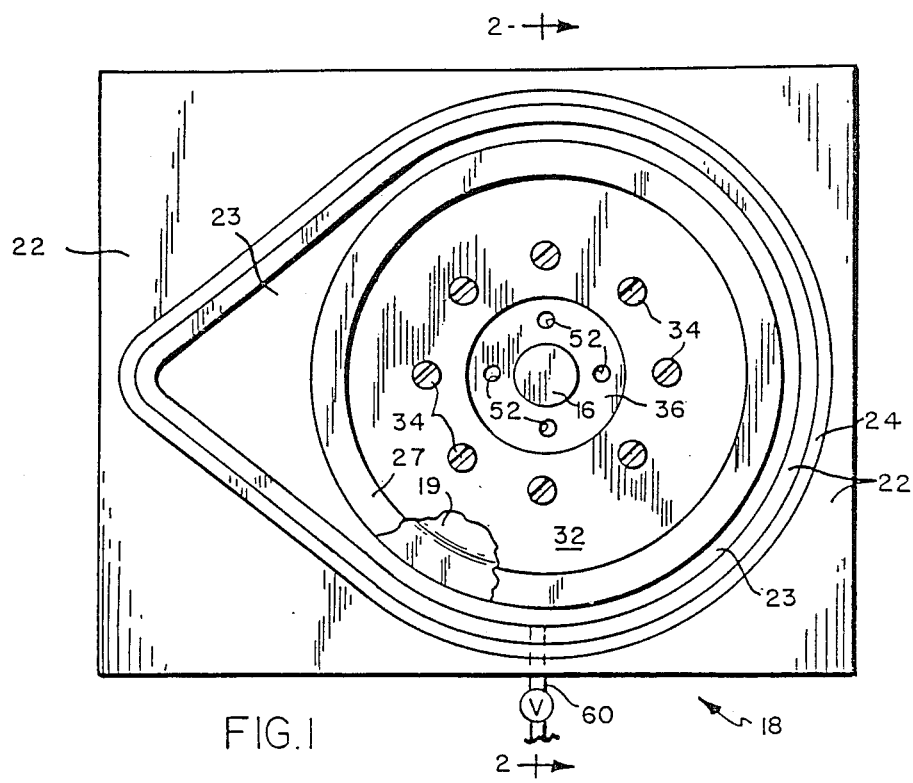
FIG. 1 is a plan view of a leak-detecting apparatus showing the relationship of a pressure chamber assembly to a container being tested of the invention taken along the Section 1:1 of FIG. 2.
Figure 2:
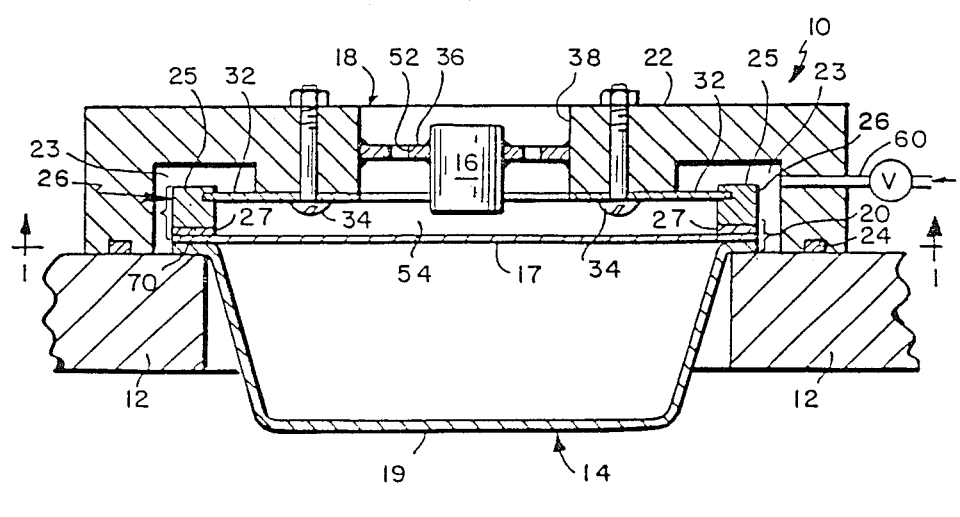
FIG. 2 is a section in elevation of a leak-detecting apparatus of the invention showing the relative position of a package being tested to a testing sensor and seal means.

Referring to FIGS. 1 and 2, it is seen that a leak-detecting apparatus 10 comprises support means 12 for a container 14 such that container 14 is positioned directly under proximity sensor 16 centered in pressure chamber assembly 18 which is positioned to seal the flange 20 of container 14 against support means 12. The sealing assembly will be positioned by conventional pneumatic or hydraulic prime mover which is not illustrated since such systems are well known and easily implemented by those skilled in the art. When such seals is accomplished, a pressure chamber 23 will form an annular zone around the package, but the pressure on the package will be limited to that exerted on the external edge of the flanged seal 20 formed by an aluminum foil lid 17 and container body 19.

Pressure chamber assembly 18 comprises an outer sealing block portion 22. A sealing gasket 24 is carried within block 22 and adapted to seal block 22 against container-support means 12 with whatever pressure is exerted on the seal by the prime mover. Assembly 18 further comprises an inner seal means 26 comprising a gasket support 25 and a sealing gasket 27 of a cast two-component polyurethane having a Shore A durometer of about 80. The gasket is, in turn, mounted on an inner sealing block 30 which is attached to the outer sealing block 22 by a thin, e.g., about 0.008-inch thick, annular piece of beryllium copper metal. This thin metal section is a spring means 32 as will be further described below. Screws 34 hold annular spring 32 to the outer sealing block 22.

Inward from inner sealing block 22 is a sensor-support ring 36 fastened to the inner wall 38 of sealing block 22. Ring 38 is sealed about and holds the centrally-positioned proximity sensor 16 and also comprises spaced conduits 52 which assure that the volume 54 above container 14 will be at ambient pressure maintained outside the pressure chamber. In most circumstances, atmospheric pressure will be convenient.

Referring to FIG. 2, it will be seen that an enclosed volume, in reality pressure chamber 23, is formed by sealing of the seal assembly 18 against container 14 and container support 12. Test air, typically at 20 to 80 pounds per square inch pressure above atmosphere, is admitted into chamber 23 through conduit 60, as will be described below.

When the fluid is admitted, the pressure will tend to force its way through defects in the container seal 70 which is formed between aluminum lid member 17 and plastic container body 19. This may be an adhesive bonded-seal or a heat seal, or another seal which is intended to be substantially air tight. This test pressure bears against annular spring 32 and helps to maintain the sealing pressure of the inner sealing block 30 against flange 20 of the container even as pressure may build up in the seal itself. Sufficient compensating pressure will find its way into any seal defects and, thus, such defects will not be sealed off by the inner seal.

When a container is properly positioned, as seen in FIG. 2, and test pressure is applied to the edge of seal, air will be forced through defects in the seal and into container 14, forcing the lid upwardly, increasing the output signal of proximity detector 16.

In operation of the apparatus, container 14 is brought into test position on support 12. Thereupon the sealing assembly 18 is caused to descend into sealing position as shown in FIG. 2. At this point the interior seal block 25 and its gasket 27 rest only lightly on the sealed flange portion 20 of the container. Test fluid, usually a gas like air or nitrogen or helium, is used to bring chamber 23 up to test pressure. Once pressure is reached, the output of the proximity detector 16 is taken as indicative of the initial vertical position of lid 17. It is suggested that this initial reading be delayed for a very short time, e.g., 0.05 to 0.3 seconds, in order to allow the package to adapt its initial test geometry to the pressure. The actual test time will depend on the nature of a particular package. It can be less than one second (but will commonly be about 2 to 3 seconds L and usually be from 1 to 60 seconds). Continuous reading of the sensor output will be obtained as a measure of the vertical position of the lid, i.e., the position assumed as a result of any gas flow through seal defects into the container.

The height of the lid will be used in determining whether the seal is defective. It is convenient to have a "reject signal", e.g., a red light or buzzer or both activated on sensing of a rejected package.

In any event, the pressure chamber is depressurized, the sealing assembly is raised and the package is removed for another cycle.

Other modes of operation can also be used. For example, time could be utilized as a constant test period and the failure of the sensor output to indicate an undesirable upward movement of the device during the set time would then indicate a suitable seal.

Figure 3:
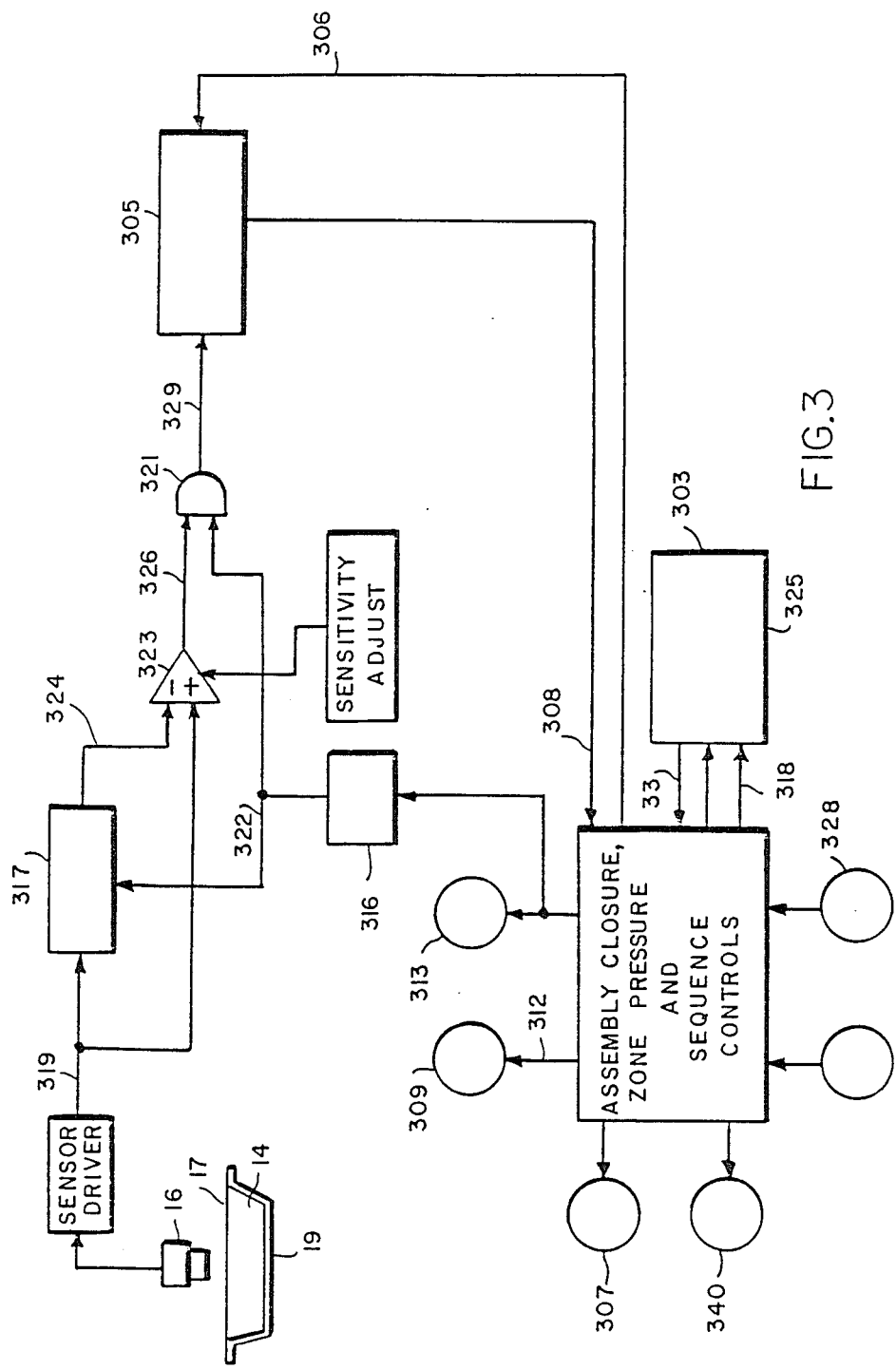
FIG. 3 is a schematic diagram indicating the use of a proximity sensor in the process of the invention.

FIG. 3 illustrates schematically the sensory control of a seal integrity tester constructed according to the invention. Conventional pneumatic and electrical apparatus such as solenoid valves and pneumatic conduits are not shown in an detail because these will be understood by those skilled in the art on reading the description.

With a package 14 to be tested in position, a test button is used to initiate a test cycle. A timer 303 is set to a maximum test time. Simultaneously, a reset signal is sent to bi-stable flip-flop 305 via conduit 306. A visual indication of a suitable state of the flip-flop is sent to green light 307 via electrical conduits 308 and 310. Also, valve 309 is actuated via conduits 308 and 312 to bring the sealing assembly (18 as seen in FIGS. 1 and 2) down to form the pressure chamber 23 around the seal to be tested.

Then, valve 313 is opened to allow gas to enter the sealing assembly. The timer is started. Then, after a 0.1 second delay 316, (in which time the mechanical shifts in package configuration due to the stresses of the pressure and sealing action may occur) the test time will be started via conduit 318. When the 0.1 second delay ends, sample-and-hold circuit 317 will go to the hold state via conduit 322. The signal to be held at this time is a signal from sensor 16 which is indicative of the vertical position of a metal package lid. This signal level on conduit 319 from sensor 16 will be held on conduit 324 even though the line 319 signal continues to vary. The signal on conduit 322 also enables the read gate 321. Read gate 321 is used to avoid setting the flip-flop at times during chamber closure, pressurization, and other times when testing is not taking place.

If the seal under test has no leaks, the signal level on conduit 319 will remain the same as the signal level on line 324. Thus, the output signal from comparator 323 on conduit 326 will not change and therefore will not allow a "set" command signal via conduit 329. The logic level signal on conduit 308 will not change, and the green "OK" lamp 307 will remain on.

The timer 303 will time down to zero and terminate the test by a signal sent through conduit 331 to the sequence controls. Alternately the test can be terminated by a stop button 328. In either case both air valves 309 and 313 simultaneously operate to depressurize and open to lift the sealing assembly.

As indicated above, if the seal being tested has a leak, the distance between the lid puffed up by gas leaking into the package and the sensor will become smaller. In such a case, the signal levels on conduit 319 and conduit 324 will be different because the conduit 319 signal voltage will increase as the lid continues to rise. Comparator 323 will send a signal based on this difference through conduit 326, thereby enabling read gate 321 and causing a "set" logic command to be output by bi-stable flip-flop 305. The resultant signal on conduit 308 will put out the green light 307 and put on the red light 340. The timer will normally stop at this time. The pressure chamber will be depressurized and raised.

Figure 4:
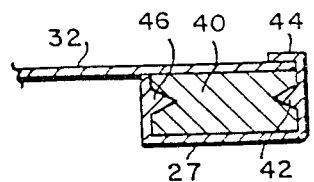
FIG. 4 is a section showing the construction of a reinforced gasket seal useful with the invention.

It is important that gasket 27 be radially stable with respect to the apparatus and package. Therefore it is often advisable to reinforce the gasket with an internal support structure 40 as seen in FIG. 4 wherein a polyurethane gasket 27 of Shore A durometer of about 80. The annular spring 32 is fixed to the aluminum support structure 40 and positioned against a small overlap in structure 40 at 44. V-grooves 46 are used to help hold the gasket 27 in position.

The apparatus described herein is already constructed to have a leak-sensitivity of about 0.2 cubic centimeter per second leak rate.

Figure 5:
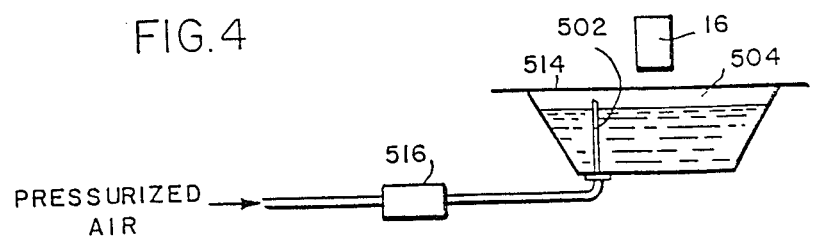
FIG. 5 is a schematic diagram showing a calibration scheme useful with the invention.

In addition to the features of the invention described above, it is sometimes advisable to provide a calibrating means with the apparatus as seen in FIG. 5. One such calibration means can comprise a hypodermic needle-like conduit 502 adapted for insertion into the headspace 504 of a container 514. A small calibrated leak device 516 (of the type commerically available) controls the amount of simulated leak gas being passed into the package.

Figure 6:
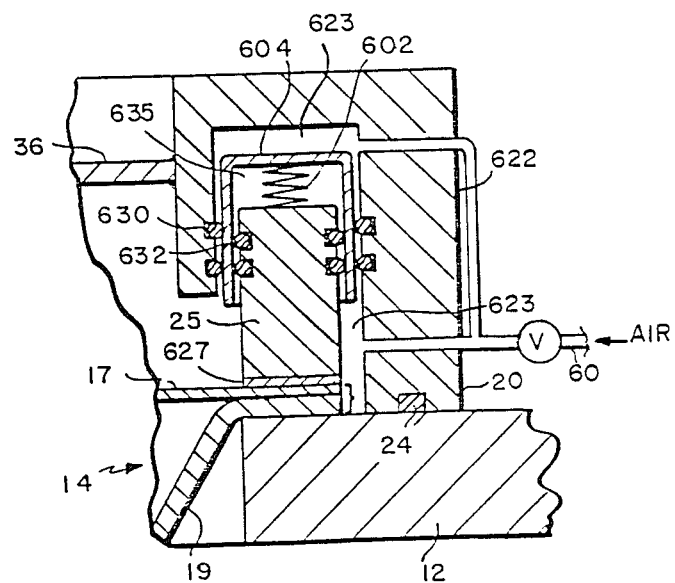
FIG. 6 is an alternative dual-force seal embodiment of the invention.

FIG. 6 illustrates schematically another sealing assembly apparatus according to the invention. A spring 602 is utilized to limit initial pressure on flange 20. However, as pressure increases in pressure zone 623, it tends to force the gasket 627 downwardly as a result of further pressure exerted on the spring by spring cap 604. The sealing pressure on gasket 627 however is independent from the mechanical sealing pressure exerted by the prime mover on gasket 24 via the principle annular sealing block 22. 0-rings 630 and 632 provide gas seal means between the pressure zone 623 and ambient and the spring chamber 635. The rings also provide sufficient flexibility and movement to allow the differential pressure to be effective at gaskets 627 and 24.

It is further noted that the apparatus can be used in a suction mode with the "pressure chamber" having a pressure below the ambient pressure. In such a case, the deflection of the lid, indicative of a leak, would be downward.

Moreover, in the suction mode, it is possible to utilize chemical sensors to detect minute quantities of materials in the container which are sucked out and use these quantities as a criterion of leak severity.

It is also to be understood that the following claims are intended to cover all of the generic and specific features of the invention herein described and all statements of the scope of the invention which might be said to fall therebetween.

What is claimed is:

1. A method for detecting a leak in a defective seal of a package having an edge seal that is formed by a bond between overlapping edge portions of walls of said package, one said wall having a flexible portion that changes shape as the volume in said package changes, said method comprising
providing said package, applying a first pressure to exposed outer edges of said edge portions of said walls and a different second pressure to said flexible portion, and detecting deflecton of said flexible wall in response to flow of gas through a leak in said edge seal between said overlapping edge portions.

2. The method of claim 1, wherein one said wall of said package provides a container having an outwardly-flared flange and another said wall of said package provides a flexible lid of said package, said lid being bonded to said flange.

3. The method of claim 2 wherein said applying said first pressure comprises applying said first pressure entirely around said flange.

4. The method of claim 1 wherein said applying includes engaging said overlapping edge portions of said walls between opposing members.

5. The method of claim 4 wherein said applying includes providing a chamber partially defined by said opposing members, said chamber being connected to a pressure control mechanism to provide said first pressure.

6. The method of claim 5 wherein said pressure control mechanism is a source of pressurized gas.

7. The method of claim 6 wherein said second pressure is ambient pressure.

8. The method of claim 5 wherein said applying includes moving said opposing members away from each other, inserting said edge portions therebetween, and moving said opposing members toward each other to engage said edge portions so as to restrict flow of air from said chamber.

9. The method of claim 8 wherein one said opposing member contacts a said wall at its edge portion with a normal force that is limited to prevent blockage of a said leak by said opposing members.

10. The method of claim 9 wherein said normal force is limited by a resilient support.

11. The method of claim 10 wherein said resilient support comprises a spring.

12. The method of claim 10 wherein said resilient support comprises a support wall member connected to one said opposing member in an orientation transverse to the direction of said normal force, said support wall member partially defining said chamber on one side, said support wall member being exposed to a lower pressure on the other side and being biased in the direction of said normal force by said first pressure.

13. The method of claim 8 wherein said moving said opposing members toward each other includes forming a seal between the two so as to provide said chamber.

14. Apparatus for detecting a leak in a defective seal of a package having an edge seal that is formed by a bond between overlapping edge portions of walls of said package, one said wall having a flexible portion that changes shape as the volume in said package changes, said apparatus comprising means to apply a first pressure to exposed outer edges of said edge portions of said walls and a different second pressure to said flexible portion, and a deflection detector to detect deflection of said flexible wall in response to flow of gas through a leak in said edge seal between said overlapping edge portions.

15. The apparatus of claim 14 wherein said means to apply comprises opposing members positioned to engage said overlapping edge portions between them.

16. The apparatus of claim 15 wherein said opposing members partially define a chamber, and said means to apply further comprises a pressure control mechanism to provide said first pressure to said chamber.

17. The apparatus of claim 16 wherein said pressure control mechanism comprises a source of pressurized gas.

18. The apparatus of claim 17 wherein said second pressure is ambient pressure.

19. The apparatus of claim 16 wherein said opposing members are mounted for movement away from each other to permit inserting said edge portions therebetween and for movement toward each other to engage the edge portions so as to restrict flow of air from said chamber.

20. The apparatus of claim 19 wherein one said opposing member is mounted to contact a said wall at its edge portion with a normal force that is limited to prevent blockage of a said leak by said opposing members.

21. The appparatus of claim 20 wherein said apparatus includes a resilient support for said one opposing member to provide said limited normal force.

22. The apparatus of claim 21 wherein said resilient support comprises a spring.

23. The apparatus of claim 21 wherein said resilient support comprises a support wall member connected to one said opposing member in an orientation transverse to the direction of said normal force, said support wall member partially defining said chamber on one side, said support wall member being exposed to a lower pressure on the other side and being biased in the direction of said normal force by said first pressure.

24. The apparatus of claim 19 further comprising a gasket that forms a seal so as to provide said chamber as said opposing members are moved toward each other.

25. Apparatus for detecting lateral leaks in defective seals of a package of the type wherein flange seals are formed by at least one lateral bond between (a) a flexible lid part of said package and (b) a outwardly-flared flange of a container part of said package, said apparatus having (a) means to support said container at a first pressure;
(b) means to isolate the entire outer edge of said flanged seal from the rest of said container, supported at a first pressure;
(c) means to apply gas at a second pressure to said outer edge of said flanged seal; and
(d) means to detect the deflection of said flexible lid in response to flow of gas through said lateral flange.

26. A process for testing leaks in a flanged seal between a flexible lid portion of a package and an outwardly-flared flange of a second part of said container said process comprising the steps of (a) applying test pressure to the lateral edge of said flanged seal while maintaining the remainder of said package at a different pressure from said test pressure; and
(b) measuring the displacement of said lid as a criterion of a leak in said lateral seal between said lid and said flange.

27. A process as defined in claim 26 wherein said flanged seal is formed of an adhesive bonded to each of said lid and said flange.

28. A process as defined in claim 27 wherein said test pressure is applied to said flanged seal after substantial isolation of said seal from ambient pressure.

* * * * *

UNITED STATES PATENT AND TRADEMARK OFFICE
CERTIFICATE OF CORRECTION

PATENT NO. : 4,774,830
DATED : October 4, 1988
INVENTOR(S) : Hulsman

It is certified that error appears in the above-identified patent and that said Letters Patent is hereby corrected as shown below:

Column 1, line 26, "et al," is changed to --et al.,--.

Column 3, line 7, --,-- is inserted after "Northvale".

Column 3, line 24, "other" is changed to --others.

Column 4, lines 3-4, "seals is" is changed to --seal is--.

Column 5, line 3, "L" is deleted.

Column 5, line 3, "seoonds" is changed to --seconds--.

Column 5, line 24, "an" is changed to --any--.

Column 6, line 14, "of Shore" is changed to --has a Shore--.

In the Claims
Column 8, line 40, "a outwardly" is changed to --an outwardly--.

Signed and Sealed this

Sixth Day of March, 1990

Attest:

JEFFREY M. SAMUELS

Attesting Officer

Acting Commissioner of Patents and Trademarks